United States Patent
Acken et al.

(10) Patent No.: US 11,615,462 B2
(45) Date of Patent: Mar. 28, 2023

(54) SYSTEM FOR VIRTUALLY SHARING CUSTOMIZED CLOTHING

(71) Applicant: Ohzone, Inc., Santa Clara, CA (US)

(72) Inventors: Kevin P Acken, Mountain View, CA (US); Warangkana Tepmongkol, Santa Clara, CA (US); Juncheng Han, Mountain View, CA (US); Pete George Markiewicz, Glendale, CA (US); Danielle Ussery, Inglewood, CA (US); Ashleigh Paynter, Los Angeles, CA (US)

(73) Assignee: Ohzone, Inc., Santa Clara, CA (US)

( * ) Notice: Subject to any disclaimer, the term of this patent is extended or adjusted under 35 U.S.C. 154(b) by 0 days.

(21) Appl. No.: 15/436,580

(22) Filed: Feb. 17, 2017

(65) Prior Publication Data

US 2017/0236197 A1 Aug. 17, 2017

Related U.S. Application Data

(60) Provisional application No. 62/296,008, filed on Feb. 16, 2016.

(51) Int. Cl.
  *G06Q 30/06* (2012.01)
  *G06Q 10/08* (2012.01)
  (Continued)

(52) U.S. Cl.
  CPC ....... *G06Q 30/0643* (2013.01); *G06Q 10/087* (2013.01); *G06Q 30/0635* (2013.01)

(58) Field of Classification Search
  CPC ............ G06Q 30/0601–0645; G06Q 30/0643; G06Q 30/0623; G06Q 30/0635; G06Q 10/087

(Continued)

(56) References Cited

U.S. PATENT DOCUMENTS 5,680,528 A  10/1997 Korszun
5,822,466 A  10/1998 Morfill et al.
(Continued)

FOREIGN PATENT DOCUMENTS

EP  2462564 B1  4/2014

OTHER PUBLICATIONS

Dematto, Amanda. 5 Ways Body Scanners Could Make Fitting Rooms Obsolete. Jun. 29, 2010. Published by Popular Mechanics. Accessed via https://www.popularmechanics.com/technology/gadgets/a5909/3d-body-scanning-technology-applications/ (Year: 2010).*

(Continued)

*Primary Examiner* — Allison G Wood
(74) *Attorney, Agent, or Firm* — Witkowski Law

(57) ABSTRACT

A system for sharing at least one selected wearable with at least one selected user on a network, the system including a server configured to receive requests to share selected wearables from one of a plurality of client devices and communicate to the at least one selected user, the server comprising: a first database configured to store a plurality of avatars; and at least one database configured to store a plurality of wearable models; a plurality of client devices communicatively coupled to the server, each of the client devices having a processor configured to: receive an avatar and the model of the wearable for an associated user; morph the clothing to fit the personalized data for each of the at least one target user in response to the sharing request; and render the image of the clothed body for each of the at least one target.

10 Claims, 3 Drawing Sheets

(51) Int. Cl.
  *G06Q 30/0601* (2023.01)
  *G06Q 10/087* (2023.01)
(58) Field of Classification Search
  USPC ..................................... 705/26.1–27.2, 26.8
  See application file for complete search history.

(56) References Cited

U.S. PATENT DOCUMENTS

| | | | |
|---|---|---|---|
| 5,850,222 A | 12/1998 | Cone | |
| 5,923,780 A | 7/1999 | Morfill et al. | |
| 5,930,769 A | 7/1999 | Rose | |
| 6,009,212 A | 12/1999 | Miller et al. | |
| 6,182,871 B1 | 2/2001 | Lam | |
| 6,307,568 B1 | 10/2001 | Rom | |
| 6,310,627 B1 | 10/2001 | Sakaguchi | |
| 6,404,426 B1 | 6/2002 | Weaver | |
| 6,415,199 B1 | 7/2002 | Liebermann | |
| 6,546,309 B1 | 4/2003 | Gazzuolo | |
| 6,556,196 B1 | 4/2003 | Blanz et al. | |
| 6,611,630 B1 | 8/2003 | Miller et al. | |
| 6,888,965 B1 | 5/2005 | Rath et al. | |
| 6,901,379 B1 | 5/2005 | Balter et al. | |
| 7,133,839 B2 | 11/2006 | Inoue et al. | |
| 7,149,665 B2 | 12/2006 | Feld et al. | |
| 7,328,177 B1 | 2/2008 | Lin-Hendel | |
| 7,355,597 B2 | 4/2008 | Laidlaw et al. | |
| 7,398,133 B2 | 7/2008 | Wannier et al. | |
| 7,433,753 B2 | 10/2008 | Okada et al. | |
| 7,492,934 B2 | 2/2009 | Mundy et al. | |
| 7,978,887 B2 | 7/2011 | Mundy et al. | |
| 8,170,919 B2 | 5/2012 | Barbour et al. | |
| 8,275,590 B2 | 9/2012 | Szymczyk et al. | |
| 8,290,568 B2 | 10/2012 | Pichler et al. | |
| 8,359,247 B2 | 1/2013 | Vock | |
| 8,364,561 B2 | 1/2013 | Wolper et al. | |
| 8,427,656 B2 | 4/2013 | Hullin et al. | |
| 8,438,081 B2 | 5/2013 | Gray et al. | |
| 8,515,145 B2 | 8/2013 | Mundy et al. | |
| 8,605,148 B2 | 12/2013 | Robertson | |
| 8,700,477 B2 | 4/2014 | Wolper et al. | |
| 8,711,175 B2 | 4/2014 | Aarabi | |
| 8,818,883 B2 | 8/2014 | Lawrence et al. | |
| 8,942,456 B2 | 1/2015 | Hesthaven et al. | |
| 9,147,207 B2 | 9/2015 | Haaramo et al. | |
| 9,189,886 B2 | 11/2015 | Black et al. | |
| 9,191,579 B2 | 11/2015 | Seidel et al. | |
| 9,241,184 B2 | 1/2016 | Weerasinghe | |
| 9,292,967 B2 | 3/2016 | Black et al. | |
| 9,489,744 B2 | 11/2016 | Black et al. | |
| 9,576,198 B2 | 2/2017 | Mundy et al. | |
| 9,679,409 B2 | 6/2017 | Black et al. | |
| 9,710,964 B2 | 7/2017 | Loper et al. | |
| 9,761,060 B2 | 9/2017 | Black et al. | |
| 9,799,098 B2 | 10/2017 | Seung et al. | |
| 9,898,848 B2 | 2/2018 | Black et al. | |
| 9,961,328 B2 | 5/2018 | Wu et al. | |
| 10,002,460 B2 | 6/2018 | Black et al. | |
| 10,008,007 B2 | 6/2018 | Taubin et al. | |
| 10,032,254 B2 | 7/2018 | Harmeling et al. | |
| 2001/0026272 A1 | 10/2001 | Feld et al. | |
| 2001/0042029 A1 | 11/2001 | Galvez | |
| 2003/0065578 A1 | 4/2003 | Peyrelevade et al. | |
| 2003/0076318 A1 | 4/2003 | Shaw-Weeks | |
| 2003/0101105 A1 | 5/2003 | Vock | |
| 2004/0049309 A1 | 3/2004 | Gardner et al. | |
| 2004/0083142 A1 | 4/2004 | Kozzinn | |
| 2004/0227752 A1 | 11/2004 | McCartha et al. | |
| 2005/0131776 A1 | 6/2005 | Perotti et al. | |
| 2005/0267614 A1 | 12/2005 | Looney et al. | |
| 2006/0202986 A1 | 9/2006 | Okada et al. | |
| 2006/0287877 A1 | 12/2006 | Wannier et al. | |
| 2007/0005174 A1* | 1/2007 | Thomas | G06Q 30/02 700/132 |
| 2007/0057942 A1 | 3/2007 | Unal | |
| 2007/0130020 A1 | 6/2007 | Paolini | |
| 2007/0179867 A1 | 8/2007 | Glazer et al. | |
| 2007/0198120 A1 | 8/2007 | Wannier et al. | |
| 2008/0249897 A1 | 10/2008 | Oh et al. | |
| 2009/0018926 A1 | 1/2009 | Buehlman | |
| 2009/0089186 A1 | 4/2009 | Paolini | |
| 2009/0115777 A1 | 5/2009 | Reyers Moreno | |
| 2010/0094729 A1 | 4/2010 | Gray et al. | |
| 2010/0191770 A1 | 7/2010 | Cho et al. | |
| 2010/0306082 A1 | 12/2010 | Wolper et al. | |
| 2011/0022965 A1 | 1/2011 | Lawrence et al. | |
| 2011/0078055 A1 | 3/2011 | Faribault et al. | |
| 2011/0298897 A1 | 12/2011 | Sareen et al. | |
| 2012/0022978 A1 | 1/2012 | Manea et al. | |
| 2012/0136755 A1 | 5/2012 | Yang | |
| 2012/0299912 A1 | 11/2012 | Kapur et al. | |
| 2013/0018763 A1 | 1/2013 | Ajala | |
| 2013/0083065 A1 | 4/2013 | Schulze | |
| 2013/0173226 A1 | 7/2013 | Reed et al. | |
| 2013/0215116 A1 | 8/2013 | Siddique et al. | |
| 2013/0249908 A1 | 9/2013 | Black et al. | |
| 2013/0293686 A1 | 11/2013 | Blow et al. | |
| 2014/0006386 A1 | 1/2014 | Oh | |
| 2014/0022238 A1 | 1/2014 | Oh | |
| 2014/0089135 A1 | 3/2014 | Linh et al. | |
| 2014/0108208 A1 | 4/2014 | Piana | |
| 2014/0149264 A1 | 5/2014 | Satyanarayana et al. | |
| 2014/0176565 A1 | 6/2014 | Adeyoola et al. | |
| 2014/0225888 A1 | 8/2014 | Bell et al. | |
| 2014/0368499 A1 | 12/2014 | Kaur | |
| 2016/0035061 A1* | 2/2016 | Gadre | A63F 13/00 345/473 |
| 2016/0035142 A1 | 2/2016 | Nair et al. | |
| 2016/0088284 A1* | 3/2016 | Sareen | G06N 3/006 348/47 |
| 2016/0148436 A1 | 5/2016 | Chang | |
| 2016/0150217 A1 | 5/2016 | Popov | |
| 2017/0214943 A1 | 7/2017 | Cohen | |
| 2017/0249783 A1 | 8/2017 | Mach Shepherd | |
| 2017/0372504 A1* | 12/2017 | Jang | G06Q 30/06 |

OTHER PUBLICATIONS

Protopsaltou, D., Luible, C., Arevalo, M., & Magnenat-Thalmann, N. (2002). A body and Garment Creation Method for an Internet Based Virtual Fitting Room. In Advances in Modelling, Animation and Rendering (pp. 105-122). Springer London, https://doi.org/10.1007/978-1-4471-0103-1_7.

Apparel Highest-Selling Category in E-Commerce in 2015. (Apr. 4, 2016). Retrieved Feb. 11, 2017, from https://sourcingjournalonline.com/apparel-was-highest-selling-category-in-online-retail-in-2015/.

Cordier, Frédéric, Wonsook Lee, Hyewon Seo, and Nadia Magnenat-Thalmann. "Virtual-try-on on the web." Laval Virtual (2001).

Weiss, A., Hirshberg, D., & Black, M. J. (2011). Home 3D body scans from noisy image and range data. In 2011 International Conference on Computer Vision. IEEE. https://doi.org/10.1109/iccv.2011.6126465.

* cited by examiner

SYSTEM FOR VIRTUALLY SHARING CUSTOMIZED CLOTHING

CROSS-REFERENCE TO RELATED APPLICATIONS

This U.S. non-provisional application claims the benefit of U.S. provisional application No. 62/296,008, filed on Feb. 16, 2016, the contents of which are expressly incorporated by reference herein. This U.S. non-provisional application is related to the following commonly-owned U.S. patent applications, which are hereby expressly incorporated by reference in their respective entireties:
  (1) U.S. Pat. No. 10,127,717, entitled "System for 3D Clothing Model Creation", issued on Nov. 13, 2018, which claims the benefit of U.S. provisional application No. 62/296,001, filed on Feb. 16, 2016;
  (2) U.S. Pat. No. 10,373,386, entitled "System and Method for Virtually Trying-On Clothing", issued on Aug. 6, 2019, which claims the benefit of U.S. application No. 62/296,005, filed on Feb. 16, 2016; and
  (3) U.S. patent publication 2017/0293941, entitled "System and Method for Targeted Personalized Ads", published on Oct. 12, 2017, which claims the benefit of U.S. provisional application No. 62/296,013, filed on Feb. 16, 2016.

BACKGROUND

Technical Field

This disclosure relates generally to the field of representing a graphical object display modeling using mathematical algorithms. More particularly, the disclosure relates to virtually sharing clothing and other wearables so that it can be virtually tried-on by the recipients.

Background Art

DESCRIPTION

One of the basic needs of human beings is clothing. In 2016, annual apparel sales were expected to exceed $1.4 trillion globally, and more than $300 billion in the United States. In 2015, apparel became the highest selling category in online retail within the United States, reaching about $75 billion in annual sales.

There are advantages in selling and purchasing clothing online. From the customers point of view, the time and effort to travel to the store may be avoided. They may purchase the clothing directly on their computer wherever they happen to be. From the retailer's point of view, the need for brick and mortar stores may be avoided altogether or reduced in number, thereby potentially saving retail store rents. The self-service nature of online sales may reduce the need for retail sales staff, and the associated costs.

There may also be disadvantages in selling and purchasing clothing online. In contrast to a customer who visits a brick-and-mortar retail store, an online customer cannot physically try on clothing before purchase. The lack of pre-sales fitting may increase the return rate because customers find that they are not satisfied with the fit or look of the clothing when they receive the order. The extra shipping and handling cost and effort of returned items can discourage purchases in the online sales channel, increase wear on unsold merchandise, and reduce profits.

E-commerce websites often display images of clothing dressed on mannequins or human models so that potential customers can visualize the clothes as they would be worn. These images are often generated by the manufacturer or the retailer to promote the product. These photographed professional models that may not represent the body type of the typical customer. However, many retailers also take photos of so-called plus-sized models and others that may represent more typical customers. These efforts may help potential customers better visualize the clothing on themselves.

When a potential customer visits a retail store, they typically have the option to try on in-stock clothing. They can verify which size of any such garments fit them and can see how the selected garment looks on them. They can try on clothing and get immediate feedback from the friends or family who visit the store with them. However, online purchases are fulfilled through centralized warehouses that may provide an advantage in terms of consolidated inventory. Consolidated inventory may allow a wider range of stocking units (SKUs) and sizes than can cost-effectively be maintained in inventory in each of numerous smaller retail stores.

Clothing retailers often provide generous return policies for clothing that is purchased online. This may encourage consumers to make online purchases of clothing despite the lack of a pre-sales fitting process.

SUMMARY

When shopping for articles of clothing and other wearables online, the shopper may see an item that they may not want for themselves but want to suggest for a family member or friend. If they were shopping together in the physical store the shopper might bring it over to their friend for them to consider it and possibly try it on.

When shopping for clothing and apparel online, sharing what one person is viewing with their friends is cumbersome, often consisting of copying and pasting web links including 2-D images of the item via social network channels. Also, many commercial websites use client-side customization that results in a sent web link not showing the same view as what is on the sender's screen. Thus, if the receiver is interested in the shared link they may have to manually customize the item.

Innovative subject matter includes a system for virtually sharing clothing and other wearables so that it can be virtually tried-on by the recipient(s) and viewed by others.

The system employs a server that maintains both an avatar database for avatars created for registered users and a clothing model database having 3-D models of articles of clothing or other wearables.

A manufacturer or retailer, or someone acting on their behalf, creates three-dimensional models of their product line of wearables.

In a preferred embodiment, the wearables are modeled using difference tables as disclosed in U.S. Pat. No. 10,127,717, entitled "System for 3D Virtual Model Creation".

Potential customers register a profile and create a personalized avatar. In a preferred embodiment, the personalized avatar is created and rendered with selected articles of clothing and other wearables as disclosed in U.S. non-provisional application entitled "System for Virtually Trying On Clothing", Ser. No. 15/436,514, filed on Feb. 17, 2017.

However, the invention may be performed using other methodologies to create avatars and wearable models, and apply selected wearable models to the avatar.

In some embodiments, a user of the system can request to share an article of clothing to at least one other user of the system.

One part of the request is to identify the product to be shared. The wearable may be identified and the share request initiated by clicking a link embedded in the product page of an e-commerce site. In a preferred embodiment, the share request can be initiated by scanning the Universal Product Code (UPC) of the wearable to be shared. The UPC code on a wearable might be scanned by the shopper if they encounter a wearable that they want to share in a retail establishment.

Another part of the share request is to identify the recipients. These may be selected from a list of connected friends as part of a built in social network on the system. It may also be selected from email addresses, and third-party social networks like Facebook. If the user is not registered in the system, they will receive a message by email or social network message indicating that the friend has shared a clothing suggestion with them and inviting them to register in the system to virtually try it on. This clothing item may be shared with multiple connections at once.

For each recipient, the server also acts to provide consumers with real-time clothing and apparel information, including a text description, 2D pictures of the items, and 3D models of the items that allow the user to visualize the item on their 3D virtual model. A system user would browse for clothing by searching the server clothing database. Clothing items would be size-selected based on the user's 3D model.

If the user decides to share the clothing item with friends who are in the same system, the share request is sent back to the server indicating which clothing item the user wished to share to which other users to share the item with.

When the server received the share item request, for each user the item will be shared with, the server loads that user's 3D model and measurements from the User 3D Model Database, and load the clothing item information, including available sizes, from the Clothing 3D Model Database and/or the Retailer Server database. The server would fit the clothing item onto that user, predicting the best fit size of the item. The server then sends a virtual display of the item with the selected size to the user receiving the shared item. If the server finds that no available size fits the user, then the clothing item information is still sent to the user indicating that the user's size is not available.

DETAILED DESCRIPTION

Various examples of embodiments will be described below with reference to the drawings. The following exemplary embodiments are illustrative and are not to be construed as limiting.

Figure 1:
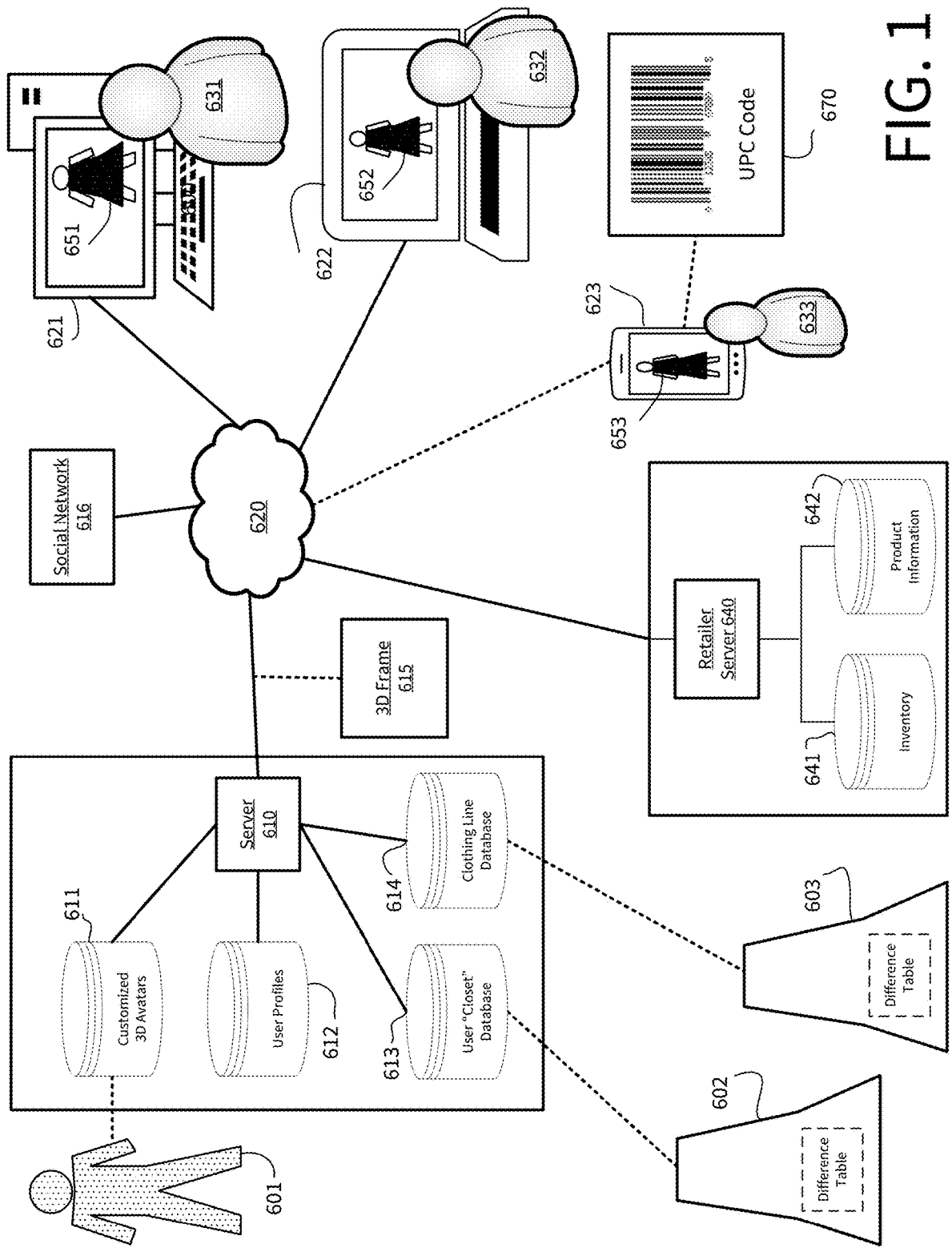
FIG. 1 illustrates one embodiment of the system for virtually sharing clothing and other wearables with others.

FIG. 1 illustrates one embodiment of the system for virtually sharing clothing and other wearables with others.

A server 610 is coupled to the Internet 620 to communicate with various client devices such as a desktop 621 operated by a user 631, a laptop 622 operated by a user 632 and a smart phone 623 operated by a user 633.

The server 610 also communicates with a retailer server 640. The retailer server 640 communicates with an inventory database 641 and product information database 642 to provide product information and inventor status to the server 610 and in some cases as part of a website or customer portal accessible directly by the user 631, the user 632 and/or the user 633 as well as other people connected via the Internet 620.

The server communicates with a customized 3-D avatars database 611, the user profile database 612, a clothing line database 614 and the user "closet" database 613.

The user profiles database 612 includes registration information for the registered users, including the user 631, the user 632 and the user 633. It may also include social network information including connections between the registered users and connections to a social network 616.

The customized 3-D avatars database 611 includes an avatar 601 personalized for each of the registered users. In some embodiments, the avatar 601 is generated using 3-D depth scanning or 2-D image interpretation of the registered user's body. In other embodiments, the avatar 601 is generated based on body measurements such as bust size, waist size, hip size and inseam length. In a preferred embodiment, the avatar 601 is created according to the disclosure in U.S. Pat. No. 10,127,717, entitled "System for 3D Virtual Model Creation". Other methods of generating an avatar may be used.

The clothing line database 614 includes models of various stock keeping units (SKUs) or articles of clothing or other wearables. In a preferred embodiment, the models of the wearables are created according to the disclosure in U.S. Pat. No. 10,373,386, entitled "System and Method for Virtually Trying-On Clothing".

The user "closet" database 613 includes models of various articles of clothing or other wearables such as wearable model 602 that are registered as owned by the client and is figuratively if not literally in their closet. In a preferred embodiment, the wearables created according to the disclosure in U.S. Pat. No. 10,373,386, entitled "System and Method for Virtually Trying-On Clothing". In some embodiments, the user "closet" database 613 includes a list of SKU s that are owned by each user, and the associated wearable model 603 is accessed by looking up that SKU in the clothing line database 614.

In some embodiments, the user "closet" database allows for the user to submit their own models of wearables that may not be included in the clothing line database 614. A user may want to do this for wearables they own which may be from a manufacturer or retailer that has not uploaded official models to the clothing line database 614. In some embodiments, a user may grant other users permission to access and try-on wearables they have stored in the user "closet" database 613. This might be useful for friends that may borrow clothes from each other.

In some embodiments, clothing models may be submitted by having third-party services scan the wearables using the same or similar techniques as the manufacturers or retailers. For example, users may bring their wardrobe into the third-party service to have the wearables scanned and the associated models uploaded to the user "closet" database 613 associated with their profile.

A user might not only be interested in how the shared wearable looks by itself, but rather how it looks when worn with other specified wearables. For example, if a blouse is shared with a user, that user may want to virtually try it on with particular pants they select from their closet, or particular pants that they are considering purchasing for use with the shared wearable. Users can virtually try-on the shared wearable in combination with wearables on their wish-list that are represented in the clothing line database 614, or items in their wardrobe that may also be in the clothing line database 614 or the user closet database 613. Thus, the sharing of the wearables not only helps sales of the wearable, but may also encourage sales of related clothing items.

In a preferred embodiment, the user 633 initiates a sharing request by using a camera on their smartphone 623 to scan a UPC code 670 of the wearable to be shared. This UPC code is relayed by a smartphone app, for example, to the server 610 to identify the wearable to be shared. The unique numeric code extracted from the graphical version of the UPC Code 670 is used to determine if a model for the wearable exists in the clothing line database 614. If it doesn't, an error message may be displayed. The user may be offered the option of more conventional product sharing of links to the product page of the selected wearable on the retailer server 640. The product code scanning feature could work with alternative barcode technologies, such as QR codes, or graphical coding standards that might be an alternative or replacement to UPC codes.

In a preferred embodiment, the server 610 sends to each of the users selected for sharing, the avatar 601 specific to that registered user, and the wearable model 603 selected for sharing to each of the users selected to receive the shared wearable. For example, if the user 633 sends the wearable 603 to the user 631 and the user 632, they each receive a 3D frame 615. The 3D frame includes the avatar 601 which has been personalized to them and the wearable model 603 that is sized for their personal avatar 601.

Each client device may access the server 610 by logging in through a browser or a software application on their device, for example. A share request may be sent through an email to the selected users inviting them to access their account through the browser or application. A share request may cause a notification to be displayed by a software application on their device that is in communication with the server 610. In some embodiments, the email or notification display includes a link that when clicked initiates the process of receiving the personalized 3D frame 615 sent by the server 615. In some embodiments, the personalized 3D frame 615 is embedded in the email message.

As a result of the customized sharing, the user 631, who is larger, would have a 3D model 651 displayed on their desktop computer 621 that represents their larger body with a larger size of the shared wearable 603. This user may also request through the user interface that the 3D model 651 be displayed using the shared wearable in combination with other wearables in the clothing line database 614 or wearables in the user "closet" database 613 that are available to that user.

The user 631, who is medium sized, would have a 3D model 652 displayed on their notebook computer 622 that represents their medium-sized body with a medium-sized version of the shared wearable 603. The user 632 may also request that the 3D model 652 be displayed using the shared wearable in combination with other wearables in their clothing line database 614 or the user "closet" database 613 that are available to that user. The selections of wearables to be displayed in combination with the shared wearable would be made independently of the same types of choices made by the user 631.

Similarly, the user 633 may view the shared wearable 603 on their own computer. The user 633, who is small sized, would have a 3D model 653 displayed on their smartphone 623 that represents their small-sized body with a small-sized version of the shared wearable 603. The user 632 may also request that the 3D model 652 be displayed using the shared wearable in combination with other wearables in their clothing line database 614 or the user "closet" database 613 that are available to that user. The selections of wearables to be displayed in combination with the shared wearable would be made independently of the same types of choices made by the other users.

One of the advantages of the use of difference tables is that it allows for fast, efficient rendering of various combinations of selected wearables on devices that may have relatively limited processing power and battery life, such as smartphone and tablets.

In some embodiments, the sharing of a wearable shares a personalized 2D rendering of a personalized 3D model.

Figure 2:
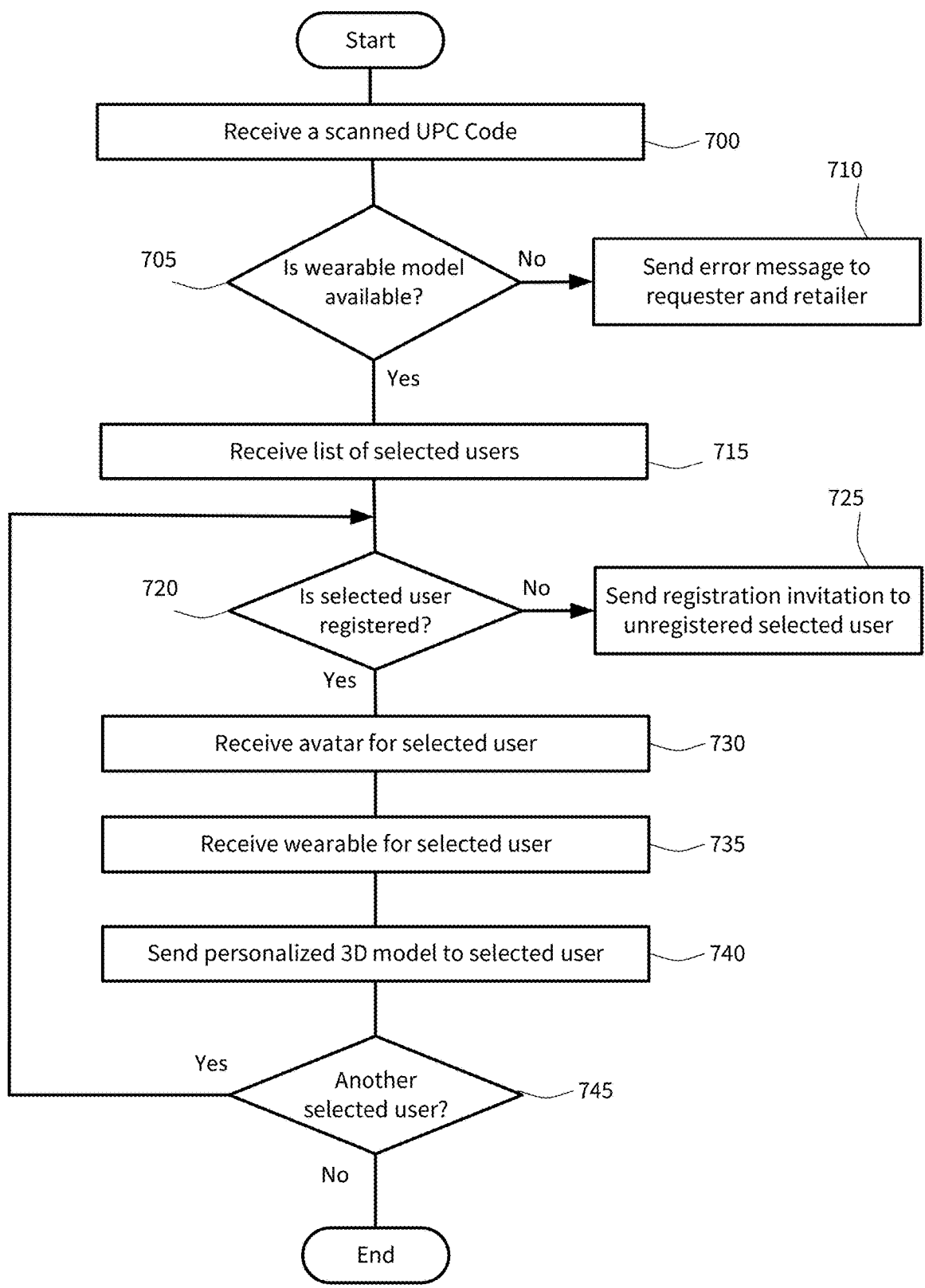
FIG. 2 is a flowchart of one embodiment of a process for virtually sharing clothing and other wearables with others.

FIG. 2 is a flowchart of one embodiment of the wearable sharing process described with reference to the system of FIG. 1.

The user 633 may see an article of clothing or other wearable in a retail store and think it would be perfect for his or her friends, the user 631 and the user 632.

The user 633 initiates a sharing process by starting an application on their smart phone 623. They identify the wearable that they want to share. In a preferred embodiment, they scan a UPC code 670 using a camera on their smart phone 623. In some embodiments, they can click a link on a website product page at the retailer server 640 that interacts with a local application on their device to initiate the sharing process and pass a product identifier to the application. It will be apparent to one skilled in the art that other codes and product identifying techniques may be used.

In this example, the user 633 scans the UPC Code 670 to identify the wearable 603 which is stored in the clothing line database 614.

The application is connected to the server 610 to relay the sharing request.

In step 700, the server 610 receives the scanned UPC code, SKU or other product identifying information.

In step 705, the server 610 queries the clothing line database 614 with the UPC code, SKU or other product identifying information to determine whether a wearable model 603 exists for that particular wearable. If not, step 710 is performed. Otherwise, step 715 is performed.

In step 710, an error message is sent to the requester to indicate that a model for the wearable does not exist. An error message or accounting may be sent to the manufacturer or retailer as to how many such requests were prevented for each particular wearable to motivate manufacturers to generate and upload models of their wearables into the product line database 614, and also use such frequency by wearable information to prioritize which wearables might be scanned into the system.

In step 715, the server 610 receives the list of selected users.

The server may receive the list of selected users as identified by the requester by reference through their smartphone app, for example, to registered profiles in the user profiles database 612. The server may receive some of the selected users by reference to email addresses, social media user names (e.g., facebook account), or other identifying information that may be matched to user profiles in the user profile database 612 if it associates the user profile with that email address or social media profile.

The application on the client device may provide a list of potential users for sharing from their network of visible user as indicated in the user profiles database 612. The recipients may be selected from any registered user in the user profiles database 612. In other embodiments, the recipients may be selected from those who are directly connected to the user 633. In yet other embodiments, the recipients may be limited to those within 3 degrees of the user 633 in the social network maintained in the user profiles 612. It will be apparent that any number of privacy control options may be used to restrict visibility and sharing.

Note that the user 633 does not have to know anything about the sizes of the recipients. The user 633 just specifies the wearable 603 and the recipients and the server 610 sends out separate personalized information to each of the recipients for rendering an image of that recipient wearing an appropriately sized wearable.

In this example, the user 633 requests to share the wearable 603 with the user 631 and the user 622.

In step 720, it is determined whether the selected user is registered in the user profile database 612. If not, step 725 is performed. Otherwise, step 730 is performed.

In step 725, an email message or social media message is sent to the unregistered selected user using the email address or social media profile used to specify that selected user. The message might notify them that a specific friend or other person they know thinks a particular clothing item would look good on them and suggest that they could virtually try it on if they become a registered user. It might offer an image of the 2D wearable and other product information from the retailer server 640 as part of the invitation.

In step 730, the avatar for the selected user is received. The avatar is loaded by accessing the avatar in the customized 3D avatar database 611 that is associated with the registered selected user's profile.

In step 735, the model for the shared wearable customized for the registered selected user is received from the clothing line database 614. In some embodiment, the selected user may specify other wearables to be used in conjunction with the shared wearable. In the case the server receives additional wearable(s) from the user "closet" database 613 and/or additional wearables from the product line database 614.

In a preferred embodiment, the wearable model includes a difference table. However, other wearable models may be used.

In step 740, the server sends the personalized avatar 601 and the personalized wearables to the selected user in a 3D frame 615.

For each of the recipients, the server 610 accesses the avatar 601 that is personalized, customized, or at least have some characteristics based on the identity of the recipient. The server sizes the wearable 603, according to the avatar 601 for the recipient. The server then renders a 3D frame 615 of the avatar 601 wearing the wearable 603.

The users may receive the notification of the shared wearable by email or notification from a local application connected to the server 610. By clicking on a link in the email, or opening a browser or other application connected to the server 610, the user would access a rendering of the 3D frame 615 including a rendering of their avatar 601 wearing the wearable 603 sized to fit their avatar 601.

The user 631 has a larger body, so they may require a larger size wearable. The rendering of the virtual try-on of the wearable 603 on their computer 621 includes an avatar 651 that is larger and wears a larger size wearable 603.

The user 632 has a medium-size body, so they may require a medium size wearable 603. The rendering of the virtual try-on of the wearable 603 on their laptop 622 includes an avatar 652 that is medium size and wears a medium size wearable 603.

The user 633 can virtually try-on the same wearable 603 on their smartphone 623. The user 632 has a small-size body, so they may require a small size wearable 603. The rendering of the virtual try-on of the wearable 603 on their smartphone 623 includes an avatar 653 that is small size and wears a small size wearable 603.

In step 745, the server 610 determines whether there another selected user in the list of users to receive the shared wearable. If there is, the next selected user is processed at step 720. Otherwise, this illustrated portion of the sharing process is completed.

In some embodiments, the server 610 also communicates with the retail server 640 to retrieve product information including inventory levels for the wearable 603 in the recipient's size for local retail stores within a certain distance of the recipient, or in-stock at selected online retailers. In some embodiments, the proximity of a particular retail stored may be measured from the home and/or work location of the user based on addresses stored in their registered user profile. In some embodiments, the proximity of local retail stores may be measured from the recipients location based on the global positioning system or other geolocation capability of their smartphone 623 or other mobile device. This is sent with the 3D frame 615 to facilitate purchase if the user likes what they see in the 3D rendering.

In one scenario, a recipient of a shared virtual wearable 603 may be somewhere away from their home or work location, perhaps in a coffee shop. They may virtually try-on the shared wearable on the smartphone display and be interested enough to want to physically try on the wearable. If the user is provided with the closest retail stores that report the wearable in their size is in stock, that may be enough encouragement to make the trip to the retail store. That is one step closer to making the sale. If the more traditional ways of sharing links to online product pages were used, the recipient may be less likely to take the next step in the purchase process because they are less able to visualize the look of the product with a website photo and they are less confident the local store may have it in stock.

Figure 3:
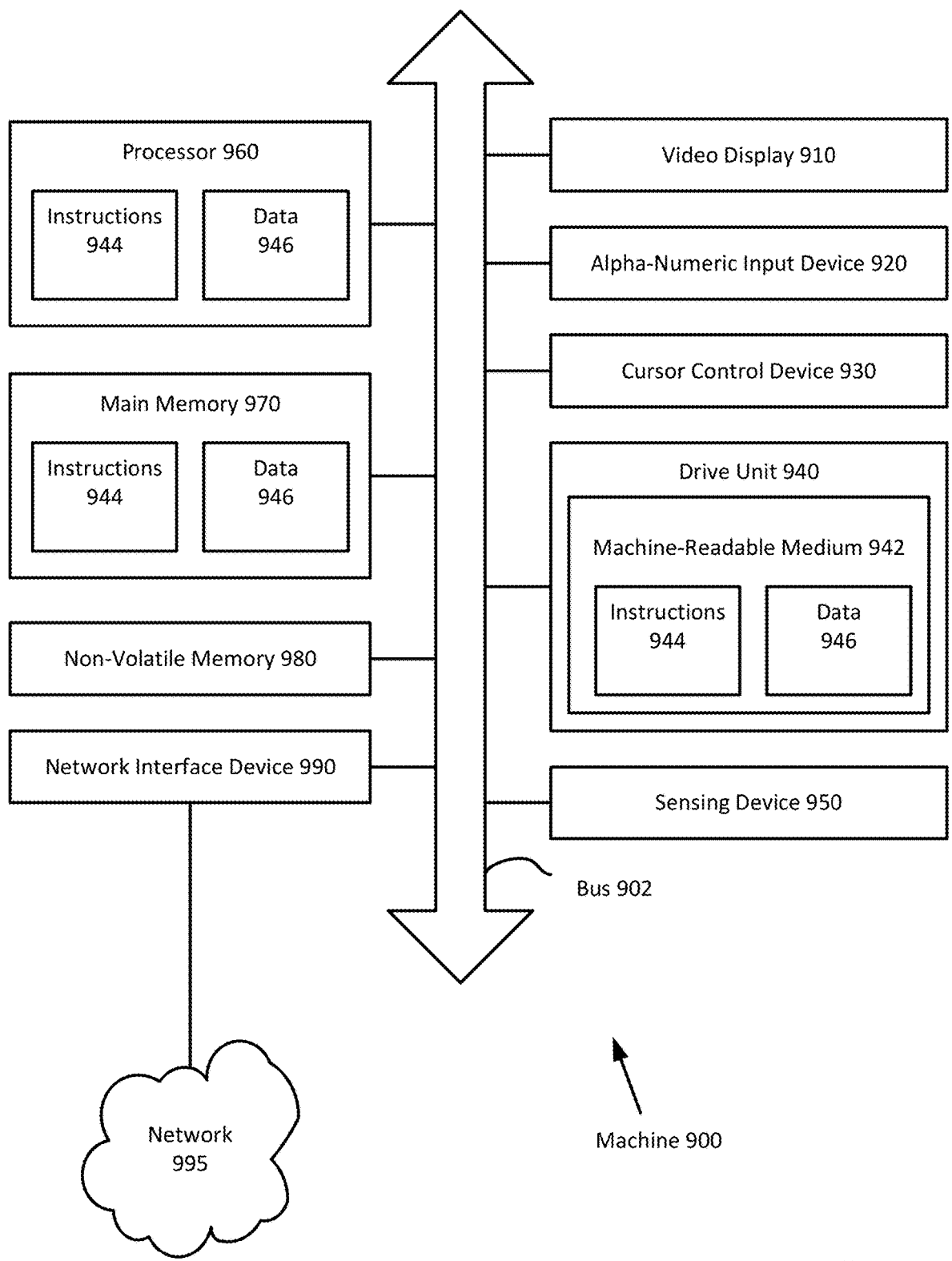
FIG. 3 is a diagrammatic representation of an embodiment of a machine 900, within which a set of instructions for causing the machine to perform one or more of the methods discussed herein.

FIG. 3 is a diagrammatic representation of an embodiment of a machine 900, within which a set of instructions for causing the machine 900 to perform one or more of the methods discussed herein. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with a server to facilitate operations of the server and/or to access the operation of the server. In some embodiments, the machine may act as a server for some functions and a client for other functions.

In some embodiments, the machine 900 is the system 150 according to an embodiment as described herein or a component of such systems, such as one or more processors that make up the system 150. In other embodiments, the machine 900 is the database system 110 according to an embodiment as described herein.

The machine 900 includes a processor 960 (e.g., a central processing unit (CPU), a graphics processing unit (GPU) or both), a main memory 970 and a nonvolatile memory 980, which communicate with each other via a bus 902. In some embodiments, the machine 900 may be a cluster of computers or comprise multiple processors or multiple processor cores. In one embodiment, the machine 900 also includes a video display 910, an alphanumeric input device 920 (e.g., a keyboard), a cursor control device 930 (e.g., a mouse), a drive unit 940 (e.g., solid state drive (SSD), hard disk drive, Digital Versatile Disk (DVD) drive, or flash drive), a sensing device 950 (e.g., a speaker) and a network interface device 990.

In some embodiments, the machine 900 is includes the sensing device 104.

In some embodiments, the video display 910 includes a touch-sensitive screen for user input. In some embodiments, the touch-sensitive screen is used instead of a keyboard and mouse. The drive unit 940 includes a machine readable medium 942 on which is stored one or more sets of instructions 944 (e.g. software) embodying any one or more of the methods or functions of the inventive subject matter.

The instructions 944 may also reside, completely or partially, on machine-readable media within the main memory 940 and within machine-readable media within the processor 960 during execution thereof by the machine 900. The instructions 944 may also be transmitted or received over a network 995 via the network interface device 990. In some embodiments, the main memory 970 and the machine-readable medium 942 also includes a data 946 including the scan information or the point clouds.

While the machine-readable medium 942 is shown in an exemplary embodiment to be a single medium, the term "machine-readable medium" should be taken to include a single medium or multiple media (e.g., a centralized or distributed database, and/or associated caches and servers) that store the one or more sets of instructions and/or data. The term "machine readable medium" shall also be taken to include any non-transitory medium that is capable of storing, encoding or carrying a set of instructions for execution by the machine and that cause the machine to perform any one or more of the methods or functions of the inventive subject matter. The term "machine-readable medium" shall accordingly be taken to include, but not be limited to, solid-state memories, optical and magnetic media, and other non-transitory tangible media.

In general, the methods executed to implement the embodiments of the disclosure, may be implemented as part of an operating system or a specific application, component, program, object, module or sequence of instructions referred to as "programs." For example, one or more programs may be used to execute specific processes according to the inventive subject matter. The programs typically comprise one or more instructions set at various times in various memory and storage devices in the machine, and that, when read and executed by one or more processors, cause the machine to perform operations to execute methods, functions and other elements of the inventive subject matter.

Moreover, while embodiments have been described in the context of machines, those skilled in the art will appreciate that the various embodiments are capable of being distributed as a program product in a variety of forms, and that the disclosure applies equally regardless of the particular type of machine or computer-readable media used to actually effect the distribution. Examples of machine-readable media include, but are not limited to, recordable type media such as volatile and non-volatile memory devices, solid state drives (SSDs), flash memory devices, floppy and other removable disks, hard disk drives, and optical disks such as Compact Disk Read-Only Memory (CD-ROMS) and Digital Versatile Disks (DVDs), among others.

What is claimed is:

1. A system for sharing at least one selected wearable with at least one selected user on a network in response to a sharing request, the system comprising:
   a server configured to receive requests to share selected wearables from one of a plurality of client devices and communicate to the at least one selected user, the server comprising:
      a first database configured to store a plurality of avatars each comprising a point cloud; and
      at least one database configured to store a plurality of wearable models, each of the wearable models comprising a difference table, each difference table comprising a plurality of differences, each difference representing a distance between a point in a point cloud for the wearable and an underlying point in the point cloud for any of the plurality of avatars according to a predetermined relationship;
   a plurality of client devices communicatively coupled to the server, each of the client devices having a processor configured to:
      receive an avatar for an associated user and a model of the wearable;
      morph the model of the wearable to fit the avatar for the associated user, comprising the step of adding the differences in the difference table to corresponding points of the point cloud for the avatar; and
      render an image of the avatar for the associated user wearing the model of the wearable.

2. The system of claim 1 wherein the model of the wearable is morphed to fit the avatar for the associated user for each of the at least one selected user in response to the sharing request.

3. The system of claim 2 wherein at least one client device is communicatively coupled to a retailer server to receive information about inventory status of a selected wearable of a size at a plurality of retail locations.

4. The system of claim 2 wherein the server is configured to receive an order for a wearable from one of the at least one selected user.

5. The system of claim 1 wherein the server is configured to receive a code for a wearable from a device and generate a request to share a model of the wearable with the at least one selected user on the network.

6. The system of claim 1 wherein the device is communicatively coupled to the retailer server to receive product information about wearables.

7. The system of claim 1 wherein the avatar comprises a point cloud representing a human body.

8. The system of claim 1 wherein the avatar is a point cloud representing one of a torso, arm, leg, hand and head.

9. The system of claim 1 wherein the predetermined relationship is defined by each of a plurality of vectors extending from a centroid of an underlying avatar, the vectors passing through corresponding points of the surface of the avatar and the wearable separated by a distance in the difference table corresponding to that vector.

10. The system of claim 1 wherein the predetermined relationship is defined by a lookup table having a plurality of entries, an entry for each point in the point cloud of the avatar identifying a corresponding point on the wearable, the corresponding points separated by a distance in the difference table corresponding to that entry.

* * * * *